United States Patent [19]

Gibson

[11] Patent Number: 4,716,997
[45] Date of Patent: Jan. 5, 1988

[54] CONDUCTIVE IDLER SHEAVE

[75] Inventor: William H. Gibson, Aurora, Colo.

[73] Assignee: Otis Elevator Company, Farmington, Conn.

[21] Appl. No.: 830,405

[22] Filed: Feb. 18, 1986

[51] Int. Cl.$^4$ ............................................. B60L 5/06
[52] U.S. Cl. ................................. 191/63; 104/178; 104/197
[58] Field of Search ............... 191/1 R, 63, 63.1, 63.2, 191/63.3.63.4, 63.5; 104/178, 197; 226/190; 254/390, 394; 474/166, 167, 174, 188, 189

[56] References Cited

U.S. PATENT DOCUMENTS

| | | | |
|---|---|---|---|
| 1,613,189 | 1/1927 | Noyes | 191/63 |
| 1,859,343 | 5/1932 | Rouge | 191/63 X |
| 2,686,891 | 8/1954 | Burgin | 191/1 R X |
| 4,031,990 | 6/1977 | Matsui et al. | 191/63 |
| 4,139,071 | 2/1979 | Tackett | 191/1 R X |

FOREIGN PATENT DOCUMENTS

| | | | |
|---|---|---|---|
| 1089026 | 1/1961 | Fed. Rep. of Germany | 104/197 |
| 2256453 | 6/1973 | Fed. Rep. of Germany | 191/63 |

Primary Examiner—Robert B. Reeves
Assistant Examiner—Frank Williams

[57] ABSTRACT

Plastic material is molded in the form of a sheave (20) about a wire steel brush (10), and interspersed between the bristles (14) thereof. A conductive path is provided to a cable (26) against which the sheave is urged via the bristles, which extend radially to the outer surface (22,24) of the sheave, and the hub (12) of the wire wheel brush.

1 Claim, 2 Drawing Figures

CONDUCTIVE IDLER SHEAVE

TECHNICAL FIELD OF THE INVENTION

The invention relates to making electrical contact with a moving cable (wire rope).

BACKGROUND OF THE INVENTION

Commonly-owned U.S. Pat. No. 4,550,663 (DeViaris, 1985) discloses a vehicle for transporting people between horizontally displaced locations. The vehicle is supported by air-cushion pads in a guideway and is drawn by a motor-driven cable. The cable is supported in the guideway by plastic (electrically nonconductive) guide sheaves, each of which is supported in the guidewway by metal (electrically conductive) brackets. the cable moves at speeds in excess of 25 mph.

By applying a voltage to the cable it is possible, among other things, to determine whether the cable has jumped off of a guide sheave, because if the cable contacts a bracket, a circuit would be completed. In this case, the vehicle would be automatically stopped.

In the event that the cable drive sheave on the motor is lined with a nonconductive material, which is typical of many cable drive applications for which the present invention is pertinent, voltage cannot be applied to the cable at the drive sheave. Therefore, it has been known to urge a longitudinal brush having metal bristles radialy against the cable to apply a voltage to the cable. This approach is limited to slow moving cables because of friction between the brush and the cable, poor tracking of the brush on the multi-helical surface of the cable, removal by the brush of the lubrication from the cable, and cable abrasion by the brush.

Alternatively, it has been known to urge a metal idler sheave against teh cable for applying the voltage. A sheave tracks the cable better, does not remove the cable lubrication, and does not abrade the cable. However, it has been found that the metal-to-metal action of the idler sheave against the cable generates unacceptably high noise levels.

DISCLOSURE OF THE INVENTION

Therefore, it is an object of this invention to provide an accoustically acceptable technique for applying a voltage to a moving cable, without damaging the cable.

According to theinvention, plastic material is molded in the form of a sheave about a wire wheel brush, an interspersed between the bristles thereof. A conductive path is provided to a cable against which the sheave is urged via the hub of the wire wheel brush and the bristles, which extend radially to the outer surface of the sheave.

It should be understood that the idler sheave of this invention is applicable to grounding a cable as well as to applying a voltage thereto.

Other objects, features, and advantages of the invention will become apparent in light of the following decription thereof.

BEST MODE FOR CARRYING OUT THE INVENTION

Figure 1:
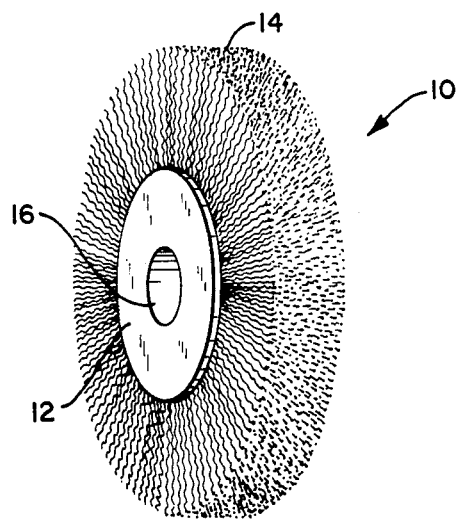
FIG. 1 is a perspective view of a wire wheel brush.

FIG. 1 shows a wire wheel brush 10 having a metal hub 12 and several metal bristles 14 of substantially equal length emanating radially from the hub 12. The hub 12 has an axial hole 16 disposed through its center. The brush 10 is basically a crimped wire wheel brush of the type used on a bench grinder.

Figure 2:
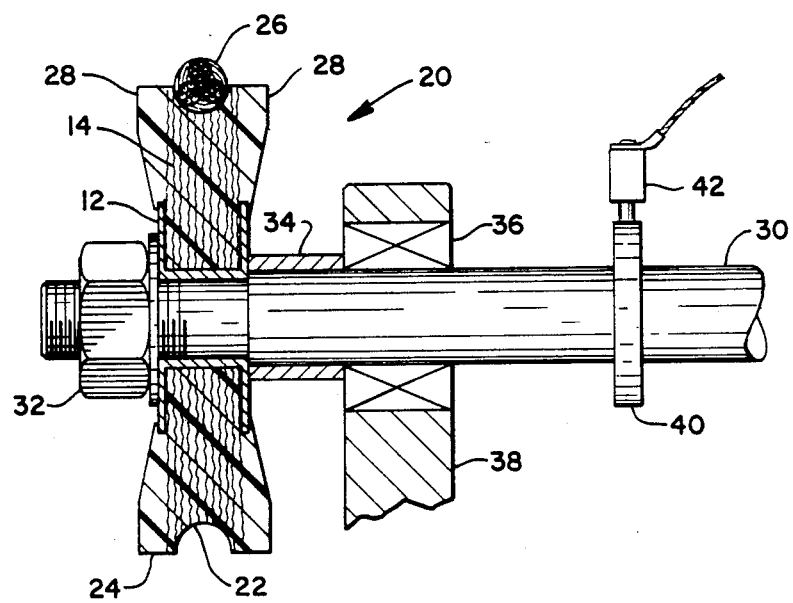
FIG. 2 is an axial cross-section of the conductive idler sheave of this invention.

FIG. 2 shows the idler pulley 20 of this invention. The pulley has a semicircular groove 22 extending inwardly from its outer surface 24 for contacting and tracking a cable 26 of like dimension.

The idler sheave 20 is composed of a plastic material, such as polyurethane which has been molded around the wire brush 10 in such a manner that the plastic material forms the sheave and is interspersed between the bristles 14. The wire brush 10 is centered in the idler sheave 20 in that the two are coaxial, and the wire bursh is centered axially within the idler sheave 20.

The bristles 14 extend to the outer surface 24 of the sheave 20. Most importantly, the bristles 14 extend to the surface of the groove 22. This is readily achieved in the molding/machining process.

The sides 28 of the idler sheave 20 are tapered inwards, preferably sufficiently to expose the sides of the hub 12 for electrical contact thereto. The hub 12 is disposed on an axle 30 and clamped thereon by suitable means, such as a nut 32 on one side of the hub 12 and a spacer 34 on the other side of the hub 12.

The axle 30 is supported on a bearing 36 mounted in a bracket 38. Thus, voltage may be applied to the cable via the bracket 38, bearing 36, axle 30, hub 12, and bristles 14.

Alternatively, a slip ring 40 is disposed on the axle 30, and voltage is applied to the cable via a brush 42, such as a carbon brush for a motor.

The axle 30 is conveniently attached to a tachometer to measure cable speed. When drive sheave speed (i.e., motor speed) is also measured via a separate tachometer, an indication of cable slippage on the drive sheave is readily obtained from a comparison of the two tachometer outputs.

I claim:
1. An idler sheave for contacting a moving cable, comprising:
   a wire wheel brush having metal bristles emanating radially from a metal hub; and
   plastic material molded in the form of a sheave coaxially onto the wire wheel brush and interspersed between the bristles, wherein the bristles extend to the outer surface of the sheave; for applying a voltage to said moving cable;
   a metal hub comprising two radially extending spaced apart plates joined by an axial tubular section, said bristles contacting said tubular section and said plates being in contact with opposite radial surfaces of said sheave.

* * * * *